United States Patent
Young et al.

(10) Patent No.: US 8,324,860 B2
(45) Date of Patent: Dec. 4, 2012

(54) DISTRIBUTED CHARGING SYSTEM AND METHOD FOR ELECTRICAL VEHICLE

(75) Inventors: James Young, Taipei (TW); Yaw-Chung Cheng, Taipei (TW); Hao-Chung Chang, Taipei (TW)

(73) Assignee: EVP Technology LLC USA, Wilmington, DE (US)

( * ) Notice: Subject to any disclaimer, the term of this patent is extended or adjusted under 35 U.S.C. 154(b) by 312 days.

(21) Appl. No.: 12/755,393

(22) Filed: Apr. 6, 2010

(65) Prior Publication Data

US 2011/0241619 A1    Oct. 6, 2011

(51) Int. Cl.
*H02J 7/00* (2006.01)
*B60K 1/00* (2006.01)
*B60L 9/00* (2006.01)
*B60L 1/00* (2006.01)

(52) U.S. Cl. ....... 320/109; 320/108; 320/110; 180/65.1; 180/65.21; 191/11; 191/12.4; 307/10.1; 307/10.7; 307/150

(58) Field of Classification Search .................. 320/109
See application file for complete search history.

(56) References Cited

U.S. PATENT DOCUMENTS

| | | | | |
|---|---|---|---|---|
| 5,187,797 A | * | 2/1993 | Nielsen et al. | 715/708 |
| 5,594,318 A | * | 1/1997 | Nor et al. | 320/108 |
| 5,661,349 A | * | 8/1997 | Luck | 307/151 |
| 2006/0219448 A1 | * | 10/2006 | Grieve et al. | 180/65.3 |
| 2009/0261779 A1 | * | 10/2009 | Zyren | 320/109 |

* cited by examiner

*Primary Examiner* — Yalkew Fantu
(74) *Attorney, Agent, or Firm* — Leong C. Lei

(57) ABSTRACT

The distributed charging system is for charging an energy storage device of an electrical vehicle operated within an operation region where a number of station or parking areas are arranged at intervals. The system contains a plurality of charging stations and fast charging devices where a charging station is provided at each station or parking area and at least a fast charging device is provided at each charging station. When the electrical vehicle is parked at a station or parking area, the electrical vehicle's energy storage device is quickly charged by the fast charging device there. Therefore, there is no additional and dedicated time spent for charging while the capacity, cost, weight, and size of the energy storage device could be reduced, making the electrical vehicle less costly, more compact, and with more extended operation time and distance.

8 Claims, 5 Drawing Sheets

DISTRIBUTED CHARGING SYSTEM AND METHOD FOR ELECTRICAL VEHICLE

TECHNICAL FIELD OF THE INVENTION

The present invention generally relates to electrical vehicles, and more particular to a distributed charging system and method where fast charging stations are arranged in the station or parking areas of the electrical vehicle.

DESCRIPTION OF THE PRIOR ART

Traditionally, various vehicles are powered by fossil fuel. However, the fossil fuel is being depleted and its consumption causes not only air pollution but also the generation of large amount of greenhouse gases such as carbon dioxide, contributing to the deterioration of global warming. Therefore, it is a trend to use electricity as the power source of various vehicles such as automobiles and vessels, replacing the use of the fossil fuel.

The key factors to the success of electrical vehicles lie in the battery performance, cost, and the ease of charging. The battery should be high density in terms of energy and power, fast chargeable, and full dischargeable. The conventional lead-acid battery is inferior under these criteria. An electrical vehicle usually requires tens of hours to complete charging, leading to the reluctance of adopting electrical vehicles.

To overcome the charging problem, battery exchange stations are proposed and provided. An electrical vehicle is driven to the battery exchange station where its low-powered battery is replaced with a fully charged battery. However, this approach has a number of disadvantages. For example, it is difficult to guarantee the quality of the replacing battery. Also, an electrical vehicle would therefore require multiple backup batteries. Generally, the cost of the battery is more than 50% of the cost of the entire electrical vehicle. Multiple backup batteries therefore lead to a significant cost increase, rendering the battery-exchange-station approach not practical.

On the other hand, to make the battery to sustain extended operation, traditionally the battery is required to have higher capacity. However, the battery's cost, weight, and size are also increased, keeping the electrical vehicle from cost down and, due to the heaviness of the battery, the electrical vehicle cannot be operated over an extended period of time and distance.

LiFeP battery is a new type of battery, having advantages such as high safety, long life, high current/power output, and fast chargeable. Its charging speed could be as high as 12C and it could be completely charged in 5 minutes. However, it still suffers the aforementioned cost, weight, and size problems.

Therefore, a novel charging mechanism is proposed by the present invention to obviate the foregoing problem so as to make the electrical vehicles could be more popular.

SUMMARY OF THE INVENTION

Therefore, an objective of the present invention is to provide a distributed charging system and method that arrange charging stations in the station or parking areas of the electrical vehicles so that the electrical vehicles could be quickly and timely recharged during their temporary stay in a station or parking area. Therefore, there is no additional and dedicated time spent for charging while, in the mean time, the capacity, and therefore, the cost, weight, and size of the energy storage device could be reduced, making the electrical vehicle less costly, more compact, and with more extended operation time and distance.

To achieve the foregoing objective, the present invention teaches a distributed charging system for charging an energy storage device of an electrical vehicle that is operated within an operation region where a number of station or parking areas are arranged at intervals for the parking of the electrical vehicle. The system contains a plurality of charging stations and a plurality of fast charging devices where a charging station is provided at each station or parking area and each charging station contains at least a fast charging device. Then, when the electrical vehicle is parked at a station or parking area, the electrical vehicle's energy storage device is quickly charged by a fast charging device of a charging station arranged in the station or parking area.

The present invention also teaches a distributed charging method for charging an energy storage device of an electrical vehicle that is operated within an operation region where a number of station or parking areas are arranged at intervals for the parking of the electrical vehicle. The method contains the following steps. First, a charging station is provided at each station or parking area and each charging station contains at least a fast charging device. Then, when the electrical vehicle is parked at a station or parking area, the electrical vehicle's energy storage device is quickly charged by a fast charging device of a charging station arranged in the station or parking area.

Each of the fast charging devices has a charging speed of more than 1C.

The energy storage device is a fast-chargeable energy storage device capable of being quickly charge. The fast-chargeable energy storage device could be a LiFeP battery or a super capacitor.

In an embodiment, the operation region contains a route where the electrical vessel runs back and forth along the route; and the parking areas are configured along the route.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The invention provides a distributed charging system and method. The gist lies in that charging stations are populated in the operation region of electrical vehicles, and an electrical vehicle is quickly charged within a short period of time when the electrical vehicle is parked in a charging station. This approach not only saves the charging time but also render obsolete the design that the electrical vehicle should have high-capacity battery.

Figure 1:
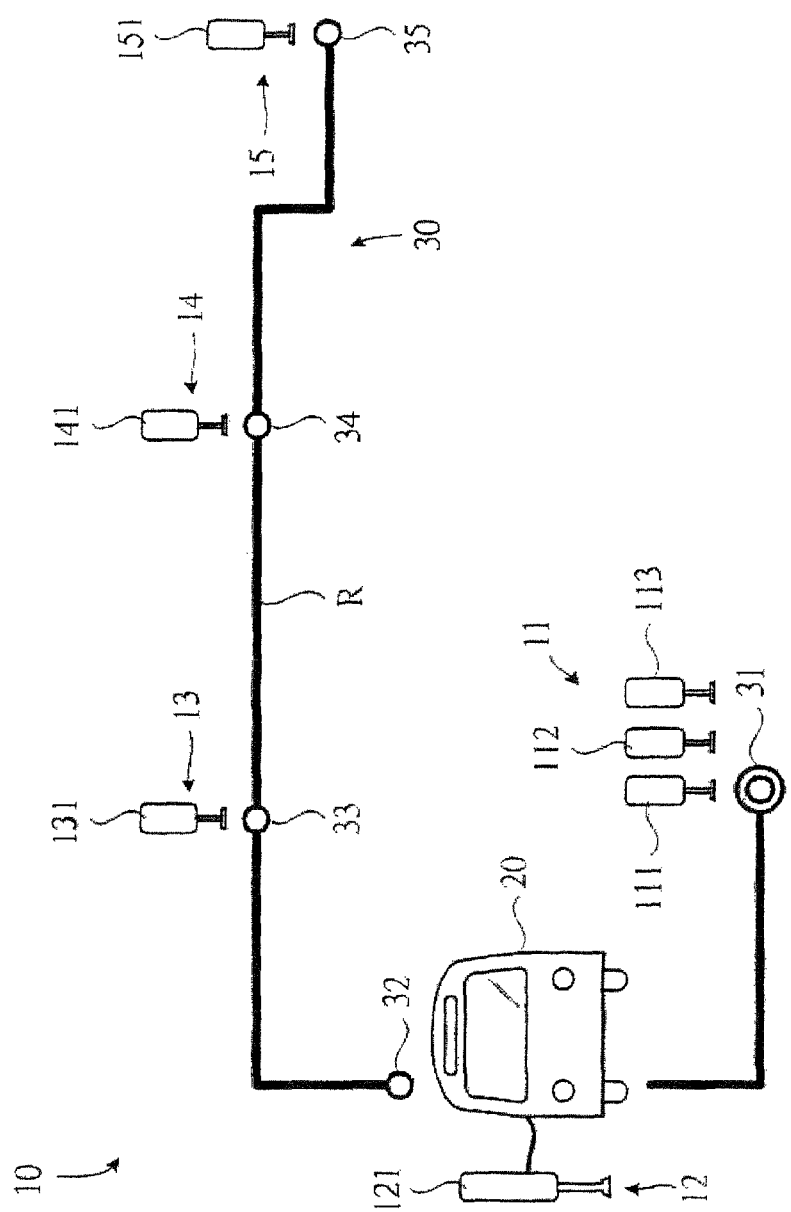
FIG. 1 is a schematic diagram showing the system architecture of a distributed charging system according to a first embodiment of the present invention.
Figure 2:
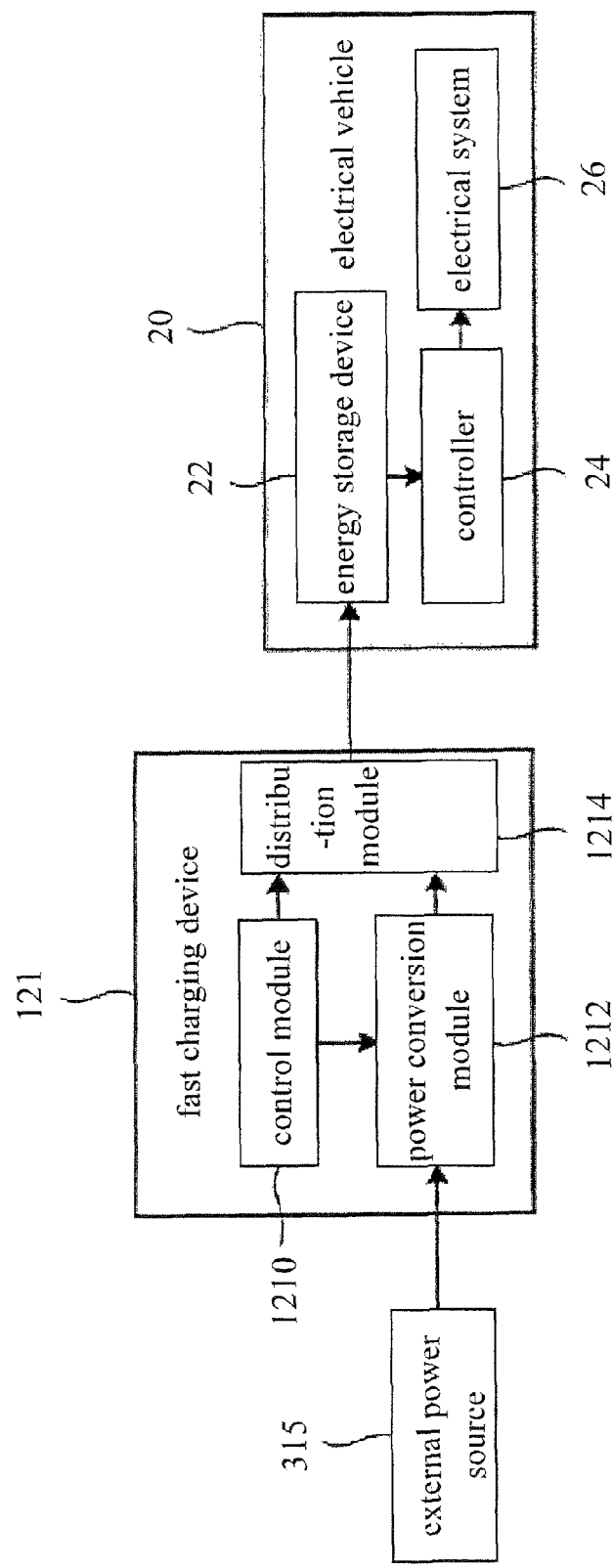
FIG. 2 is a schematic diagram showing an electrical vehicle is charged by a fast charging device of the present invention.

FIG. 1 is a schematic diagram showing the system architecture of a distributed charging system according to a first embodiment of the present invention. FIG. 2 is a schematic diagram showing an electrical vehicle is charged by a fast charging device. As illustrated, an electrical vehicle 20 is operated within an operation region 30 where a number of station or parking areas 31, 32, 33, 34, and 35 are arranged with appropriate distance in between for the temporary parking of the electrical vehicle 20. The electrical vehicle 20 is configured with an energy storage device 22 for the provision of electricity. The distributed charging system 10 provides charging to the energy storage device 22.

The distributed charging system 10 contains a number of charging stations 11, 12, 13, 14, and 15, located at the station or parking areas 31, 32, 33, 34, and 35, respectively. Each charging station is configured with at least a fast charging device to provide fast charging to the energy storage device 22 of the electrical vehicle 20. In the drawing, the charging station 11 is configured with fast charging device 111, 112, 113; the charging station 12 is configured with fast charging device 121; the charging station 13 is configured with fast charging device 131; the charging station 14 is configured with fast charging device 141; and the charging station 15 is configured with fast charging device 151. As illustrated, when the electrical vehicle 20 is parked in the station or parking area 32, it could be quickly charged by the fast charging device 121 of the charging station 12 there.

In the following, the charging of the electrical vehicle 20 is briefly described. As shown in FIG. 2, the electrical vehicle contains an energy storage device 22, a controller 24, and an electrical system 26. The electrical vehicle 20 is an electricity-powered vehicle such as an electrical bus, electrical automobile, electrical motorcycle, electrical bicycle, electrical stacker, electrical pallet truck, electrical vessel, etc. The energy storage device 22 is for the storage of electricity required by the operation of the electrical vehicle 20 and is a fast chargeable energy storage device that could be quickly chargeable. In practice, the energy storage device 22 could be a Li battery or a super capacitor. Please note that fast charging is referred to a charging speed of at least 1C. The controller 24 is for power management and the electrical system 26 includes the power delivery module and functional module inside the electrical vehicle 20. The electricity from the energy storage device 22 is delivered to the electrical system 26 through the controller 24.

The fast charging device 121, capable of achieving charging speed above 1C, contains a control module 1210, a power conversion module 1212, and a distribution module 1214. The fast charging device 121 is connected to an external power source 315 to draw electricity for the charging of the energy storage device 22. The control module 1210 is the core of the fast charging device 121, managing the power conversion module 1212 and the distribution module 1214. The external power source 315 is usually an AC power source and AC power is converted to DC power by the power conversion module 1212, and then delivered to the energy storage device 22 in predetermined transmission modes by the distribution module 1214.

As the gist of the present invention is not about the charging structure and the electrical vehicle, therefore, the fast charging device 121 and the electrical vehicle 20 are briefly described as above. Their details are omitted for simplicity sake.

According to a first embodiment of the present invention, the operation region 30 is configured with a route R and the station or parking areas 31, 32, 33, 34, and 35 are configured along the route R. Specifically, the present embodiment is an application of the present invention to public transportation where the electrical vehicle 20 is an electrical bus running back and forth along the route R and the station or parking areas 31, 32, 33, 34, and 35 are the stops. When the electrical vehicle 20 is temporarily parked in a station or parking area for picking up and unloading passengers, the electrical vehicle 20 could be quickly charged by the one of the charging stations 11, 12, 13, 14, and 15 there, without having to spend additional time specifically for charging.

Furthermore, an electrical bus would run more than 20 kilometers after being charged for one or two minutes and, before its electricity depletes, it could stop at any one of the station or parking areas for recharging. Therefore, the basic design of the electrical vehicle could be changed to have the capacity of the energy storage device reduced to at least a half or even lower. As such, the cost, weight, and size of the energy storage device 22 could be significantly reduced, leading to the cost reduction, lighter weight, lower electricity consumption, and extended operation distance and time of the electrical vehicle 20.

Figure 3:
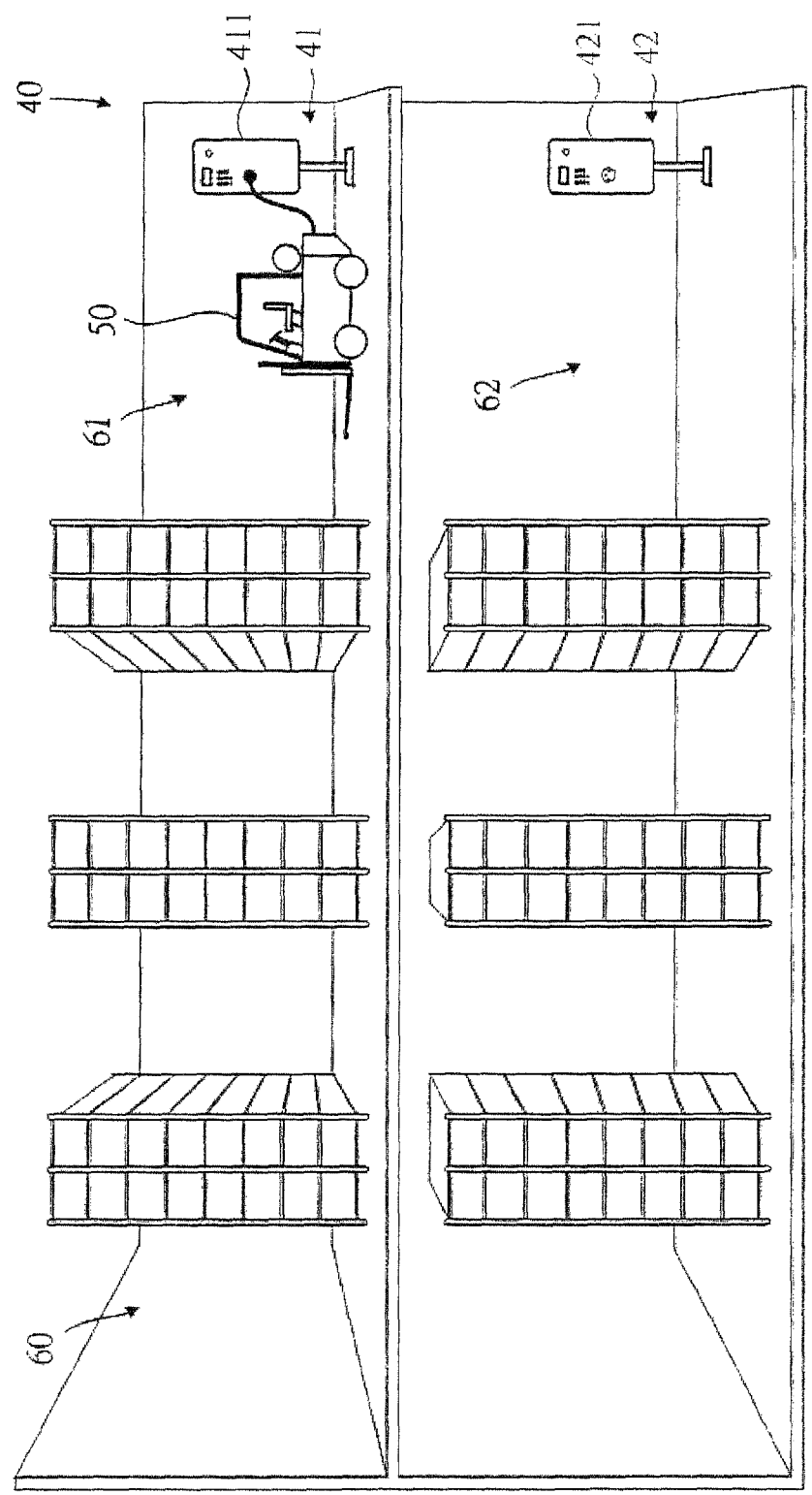
FIG. 3 is a schematic diagram showing the system architecture of a distributed charging system according to a second embodiment of the present invention.

FIG. 3 is a schematic diagram showing the system architecture of a distributed charging system according to a second embodiment of the present invention. As illustrated, the present embodiment is an application of a distributed charging system 40 of the present invention to a warehouse (i.e., operation region 60). An electrical vehicle 50 is a forklift or van for moving cargos. Station or parking areas 61 and 62 are arranged in the operation region 60 for the parking of the electrical vehicle 50. The distributed charging system 40 contains charging stations 41 and 42 located at the station or parking areas 61 and 62, respectively. The fast charging devices 411 and 421 are configured in the charging stations 41 and 42, respectively, for the electrical vehicle 50's fast charging.

Figure 4:
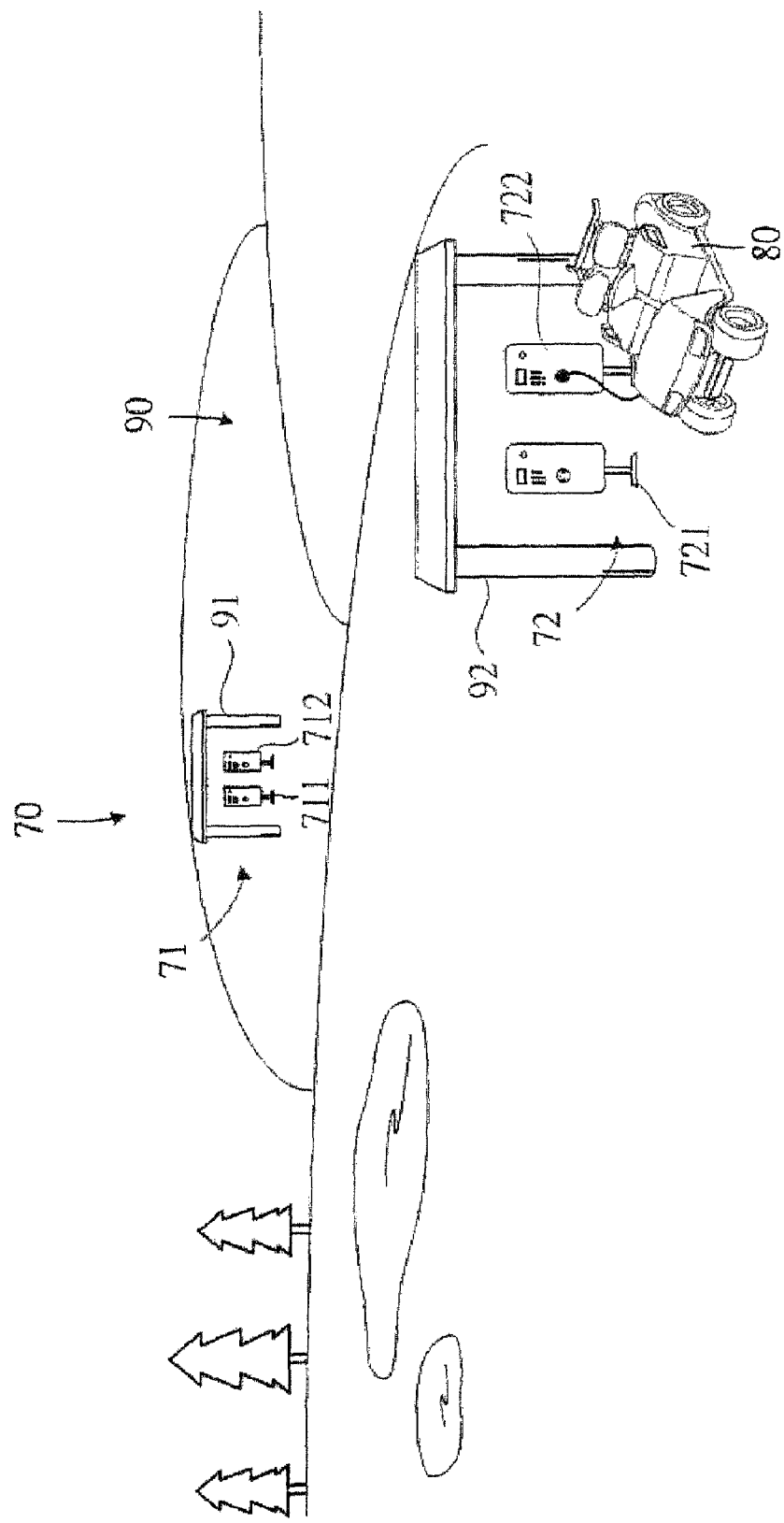
FIG. 4 is a schematic diagram showing the system architecture of a distributed charging system according to a third embodiment of the present invention.

FIG. 4 is a schematic diagram showing the system architecture of a distributed charging system according to a third embodiment of the present invention. As illustrated, the present embodiment is an application of a distributed charging system 70 of the present invention to a theme park (i.e., operation region 90). An electrical vehicle 80 is an electrical coach for carrying tourists. Station or parking areas 91 and 92 are arranged in the operation region 90 for the parking of the electrical vehicle 80. The distributed charging system 70 contains charging stations 71 and 72 located at the station or parking areas 91 and 92, respectively. The fast charging devices 711, 712 and 721, 722 are configured in the charging stations 71 and 72, respectively, for the electrical vehicle 80's fast charging when loading and unloading tourists.

In an alternative embodiment, the present invention could be applied to electrical vessels where charging stations are configured along river bank or around lake shore so that an electrical vessel could be charged by the fast charging device of each charging station. In another embodiment, the present invention could be applied to a construction site where charging stations are configured in the parking lots of the work vehicles for the fast charging to, for example, electrical excavator, etc. In addition to the foregoing applications, the present invention could be widely applied to any sites where electrical vehicles are employed such as merchandise distribution centers, shopping malls, factories, air ports, golf courses, etc.

Figure 5:
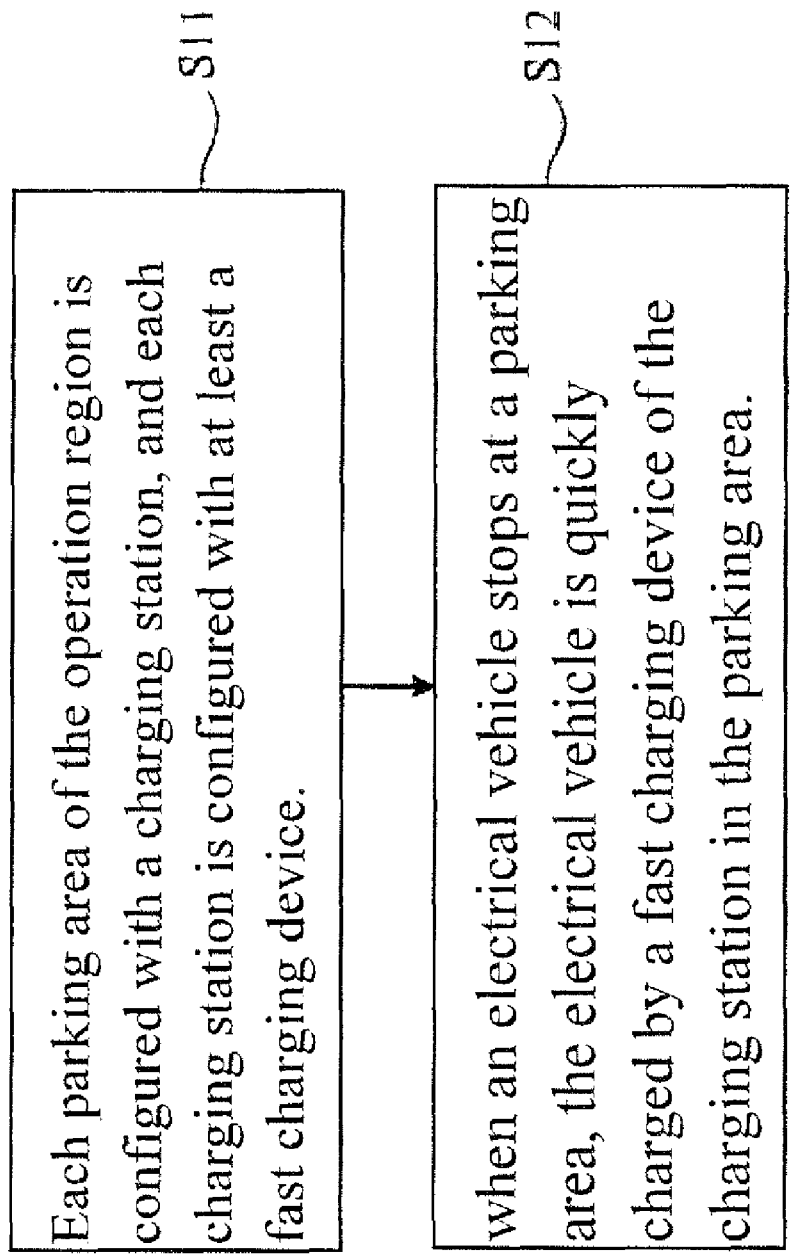
FIG. 5 is a flow diagram showing a distributed charging method according to the present invention.

In the following, a distributed charging method of the present invention is provided. FIG. 5 is a flow diagram showing a distributed charging method according to the present invention. Along with FIG. 1, the distributed charging method is applicable to charge an energy storage device 22 of an electrical vehicle 20. The electrical vehicle 20 is operated within an operation region 30 where station or parking areas 31, 32, 33, 34 and 35 are arranged at intervals for the parking of the electrical vehicle 20. As illustrated, the distributed charging method contains the following steps.

First, in step S11, each station or parking area 31, 32, 33, 34, or 35 of the operation region 30 is configured with a charging station 11, 12, 13, 14, or 15, and each charging station is configured with one or more fast charging devices.

Then, in step S12, when an electrical vehicle 20 stops at a station or parking area (e.g., parking area 32), the electrical vehicle 20 is quickly charged by a fast charging device (e.g., 121) of the charging station (e.g., 12) in the station or parking area. Fast charging means that the charging speed is more than 1C.

As described, the distributed charging system and method of the present invention arrange charging stations in the electrical vehicles' parking areas so that the electrical vehicles could be quickly and timely recharged during their temporary stay in a station or parking area. Therefore, there is no additional and dedicated time spent for charging while, in the mean time, the capacity, and therefore the cost, weight, and size of the energy storage device could be reduced, making the electrical vehicle less costly, more compact, and with more extended operation time and distance. The popularity of electrical vehicles would significantly be benefited by the present invention.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A distributed charging system for charging an energy storage device of an electrical vehicle that is operated within an operation region where a plurality of stations or parking areas are arranged at intervals for the parking of said electrical vehicle, said operation region comprises a route, said electrical vehicle runs back and forth along said route, said stations or parking areas are configured along said route, and, when said electrical vessel parks at a station or parking area, said electrical vessel is charged, said system comprising:
   a plurality of charging stations; and
   a plurality of fast charging devices;
   wherein a charging station is provided at each station or parking area; and at least a fast charging device is provided at each charging station.

2. The distributed charging system according to claim 1, wherein each of said fast charging devices has a charging speed of more than 1C.

3. The distributed charging system according to claim 1, wherein said energy storage device is a fast-chargeable energy storage device capable of being quickly charge, and is selected from the group consisting of a LiFeP battery and a super capacitor.

4. The distributed charging system according to claim 1, wherein said electrical vehicle is selected from a group consisting of an electrical bus, electrical automobile, electrical motorcycle, electrical bicycle, electrical work vehicle, electrical stacker, electrical pallet truck, and an electrical vessel.

5. A distributed charging method for charging an energy storage device of an electrical vehicle operated within an operation region where a plurality of parking areas are arranged at intervals for the parking of said electrical vehicle, aid operation region comprises a route, said electrical vehicle runs back and forth along said route, said stations or parking areas are configured along said route, and, when said electrical vessel parks at a station or parking area, said electrical vessel is charged, said method comprising the following steps:
   providing a charging station at each of said station or parking areas, each charging station comprising at least a fast charging device; and
   when said electrical vehicle is parked at a station or parking area, said electrical vehicle's energy storage device is quickly charged by a fast charging device of a charging station arranged in said station or parking area.

6. The distributed charging method according to claim 5, wherein each of said fast charging devices has a charging speed of more than 1C.

7. The distributed charging method according to claim 5, wherein said energy storage device is a fast-chargeable energy storage device capable of being quickly charge, and is selected from the group consisting of a LiFeP battery and a super capacitor.

8. The distributed charging method according to claim 5, wherein said electrical vehicle is selected from a group consisting of an electrical bus, electrical automobile, electrical motorcycle, electrical bicycle, electrical work vehicle, electrical forklift, electrical pallet truck, and an electrical vessel.

* * * * *